R. W. SCOTT.
HOSIERY KNITTING MACHINE.
APPLICATION FILED DEC. 31, 1914.

1,317,897.

Patented Oct. 7, 1919.
5 SHEETS—SHEET 2.

R. W. SCOTT.
HOSIERY KNITTING MACHINE.
APPLICATION FILED DEC. 31, 1914.

1,317,897.

Patented Oct. 7, 1919.
5 SHEETS—SHEET 4.

R. W. SCOTT.
HOSIERY KNITTING MACHINE.
APPLICATION FILED DEC. 31, 1914.

1,317,897.
Patented Oct. 7, 1919.
5 SHEETS—SHEET 5.

UNITED STATES PATENT OFFICE.

ROBERT W. SCOTT, OF BOSTON, MASSACHUSETTS, ASSIGNOR, BY MESNE ASSIGNMENTS, TO SCOTT & WILLIAMS, INCORPORATED, A CORPORATION OF MASSACHUSETTS.

HOSIERY-KNITTING MACHINE.

1,317,897.         Specification of Letters Patent.         Patented Oct. 7, 1919.

Application filed December 31, 1914. Serial No. 879,887.

*To all whom it may concern:*

Be it known that I, ROBERT W. SCOTT, a citizen of the United States, and resident of Boston, in the county of Suffolk and State of Massachusetts, have invented certain new and useful Improvements in Hosiery-Knitting Machines, of which the following is a specification.

My invention relates to improvements in knitting machines adapted to knitting double or multiple-course fabrics, as well as to improvements in machines capable of knitting relatively complete articles of hosiery, such as stockings having integral welts, mock rib tops, and seamless legs, heels and toes, one object of my invention being to provide a relatively simple machine of the latter class capable of automatic operation in an improved manner.

Another object of my invention is to provide a machine of the class indicated with automatic devices operating in an improved manner for the formation in desired parts of the product of mock-rib or accordion-fabric, tucked, or other multiple-course fabric sections of structures well known in the art.

For the above and other purposes my machine comprises improvements applicable to existing knitting machines, as illustrated in connection with the machine disclosed in my applications Serial No. 746,070 filed February 3, 1913 [Letters Patent No. 1,152,850, dated Sept. 7, 1915] and Serial No. 766,401 filed May 8, 1913 [Letters Patent No. 1,148,055, dated July 27, 1915.]

I have illustrated my improvements in connection with a machine comprising a needle cylinder 260, having means for supporting and operating said needle cylinder and its coöperating parts comprising a driving shaft 32, a bevel gear 31, and a main pattern or cam shaft 80, all of which may be of any known or usual construction, and having a pattern surface 120 such as that of my said applications, usually operated from shaft 80, but which may be provided with auxiliary pawling mechanism (not shown) for moving said surface 120 in time with the passage past a given point of predetermined segments of the needle cylinder 260, in order accurately to time the operation of certain mechanism coöperating with said needle cylinder. The indications of the pattern surface 120 are transmitted to the devices at the knitting head by means including a series of thrust bars 460, 26.

The needle cylinder 260 is equipped with the usual long and short butt series of independently movable latch needles which may be tensioned needles, for the usual stocking knitting purposes, and coöperating with said needles a relatively fixed cam ring 271 is provided with a cam ledge having parts 40 at an elevation fixing an idle position for the needles such as to retain the last knit loop upon their open latches, hereinafter referred to as the tuck position.

In a depression having slopes 5 in said ring 271 a top center cam 8 and a bottom center cam 9 are fixedly mounted. A leading stitch cam 7 and a following stitch cam 6 are provided for coöperation with cams 8 and 9 and slopes 5, together constituting the main knitting cams. Said cams 6 and 7 may be radially removable, as by mounting them upon a ring segment 370. The said machine may further be provided for the usual stocking knitting purposes with a switch cam 415, a positioning cam 411 following said switch cam in the direction for rotary work, and with narrowing pickers 650 and a widening picker 680, all coöperating together for the said purposes.

Upon a standard 401 at the rear of the machine a latch guard ring 550 is pivoted at 552 to rest when operative on the standard 400 in front of the machine, in which ring is provided a yarn feed throat 559 from which yarns controlled by yarn changing yarn-guides or fingers F are given to needles at said main knitting cams. Said machine may also include if desired a device for operating one of the guides F for feeding a splicing yarn, and a brush latch opener 425, such as that shown and claimed in my application Serial No. 845,845 filed June 18, 1914. The construction and operation of the yarn feeding devices may be the same as that shown and claimed in my application Serial No. 845,844 filed June 18, 1914, Patent No. 1,238,052, Aug. 21, 1917, the yarn guides F being pivoted on the stud 554, said guides being directly operated by the upper ends of some of the thrust bars 460.

Figure 1:
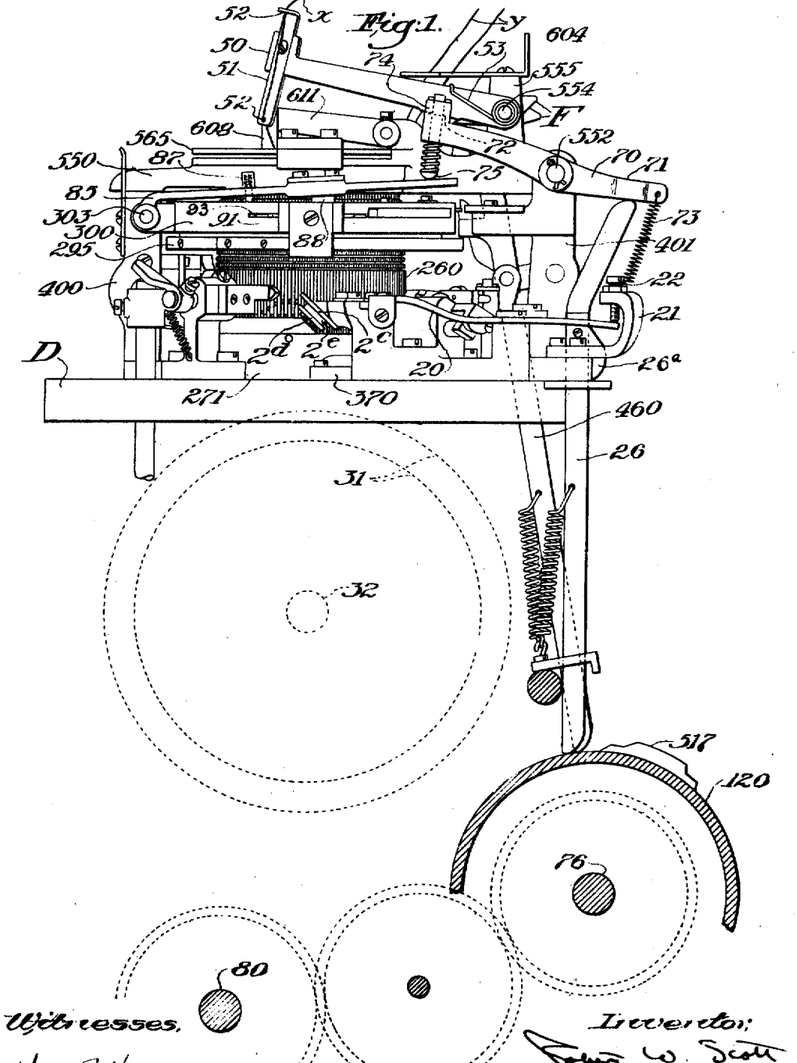
Figure 1 is a right side elevation of the knitting head and pattern mechanism of a machine provided with construction illustrating my present invention.
Figures 3, 4, 7, 8, 9, 10, 11, 12:
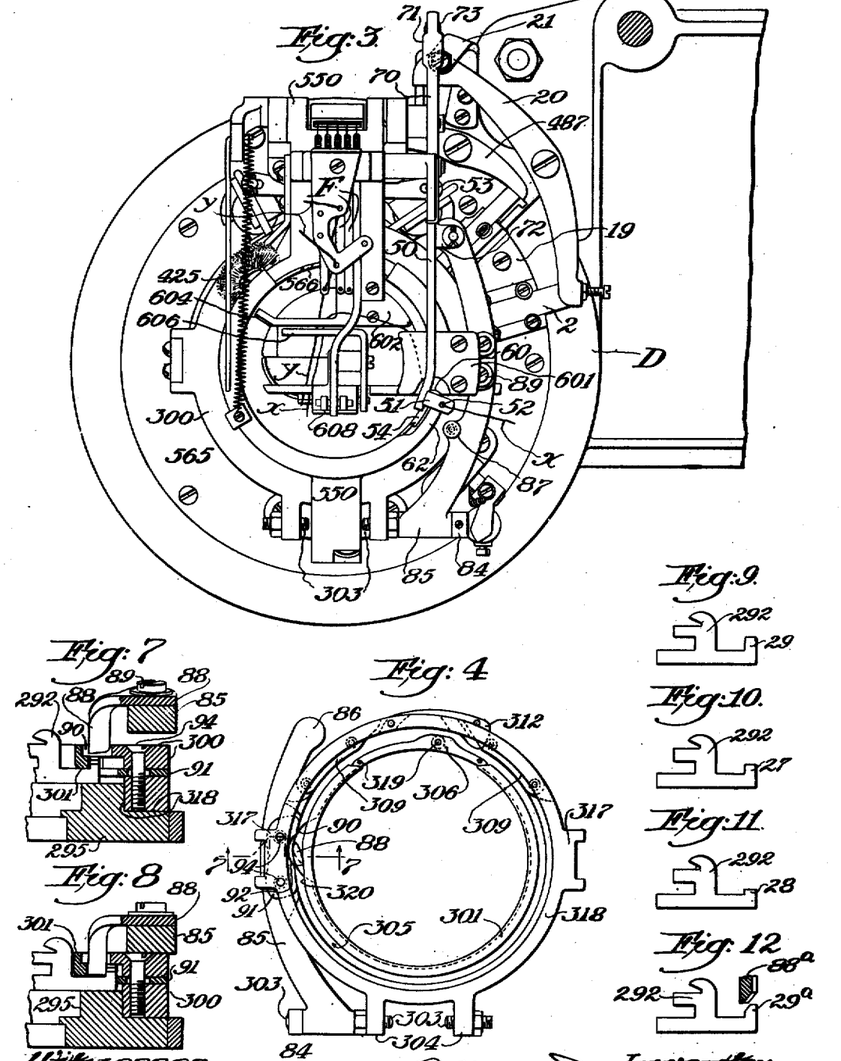
Fig. 3 is a plan of the knitting head.
Fig. 4 is an under plan of the web-holder cap ring.
Figs. 7 and 8 are sections on line 7—7 of Fig. 4 illustrating two different positions of the auxiliary web-holder cam.
Figs. 9, 10 and 11 are details showing webholders having butts of three different lengths.
Fig. 12 is a detail illustrating a modification of the web-holders and auxiliary webholder cam.

The needle cylinder 260 carries an attached web-holder bed 295 Figs. 1, 7 and 8, which may be the same as that of my said applications.

A web-holder cam cap 300 is mounted for free rotation on an annular shoulder of said bed 295, said cap being held stationary in each direction by one of the adjustment screws 303 in lugs 304 straddling the standard 400, as usual.

On said cam cap, to coöperate with the needles and the main knitting cams as explained in my said application Serial No. 746,070, an out-throw cam 306 and adjustable in-throw cams 309 are provided in coöperation with the independently movable web-holders 292 carried in radial grooves in the bed 295. The machine may also be provided with an automatically adjustable cam 312 for shifting the time of actuation of the web-holders 292 having long butts 29 at the region of the main stitch cams. Said cam cap is provided with a concentric groove 305 for maintaining the web-holders, except as described below, in their advanced position.

The cam ring 271 of the machine claimed in my said application Serial No. 766,401 has therein a groove 364 to accommodate the butts of independently actuated jacks 380 carried in the needle grooves of the needle cylinder 260, or in some of said grooves, said jacks coöperating with an advancing cam 366 to produce the vertical separation of two or more intercalated series of needles prior to their passage into main knitting cams 6, 7, 8 and 9, and prior to their passage of a supplemental cam 382, radially movable to determine whether or not the needles not provided with jacks will take an idle path under the leading stitch cam 7 and under the bottom center cam 9. Needles affected by the jacks 380 and the jack cam 366 pass above cam 382 and into the knitting cams. The elevation given the needles having jacks at the apex of the cam 366 is such as to cause them to clear their loops beneath their latches.

For knitting articles having beginning selvages or out-turned welts, or both, cam 382 is operated in a manner fully set out in my said application 766,401 to determine during the presence of the series of needles having jacks in the active knitting groove, first to receive yarn during the making of the selvage, and thereafter to knit, the passage of the remaining needles having no jacks in the idle groove 10, during which passage said needles without jacks withhold their previous loops to tie down the welt.

Without disturbing the operative relation of the stitch cams, the jack-cam 366 and the cam 382, I now provide a device for interknitting an independent yarn at alternate courses on some of the needles.

Figure 2:
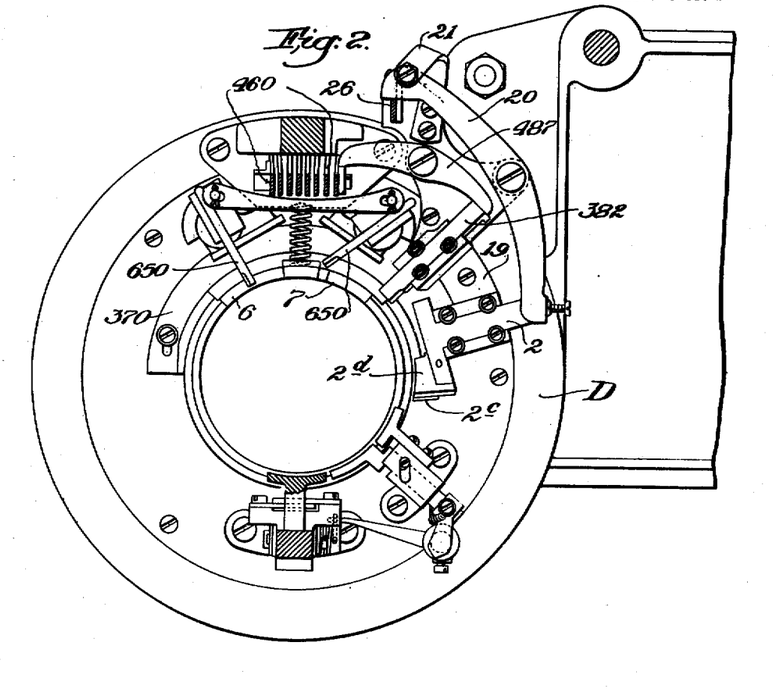
Fig. 2 is a plan view taken above the bed plate, the needle cylinder and the attached parts being removed.
Figure 5:
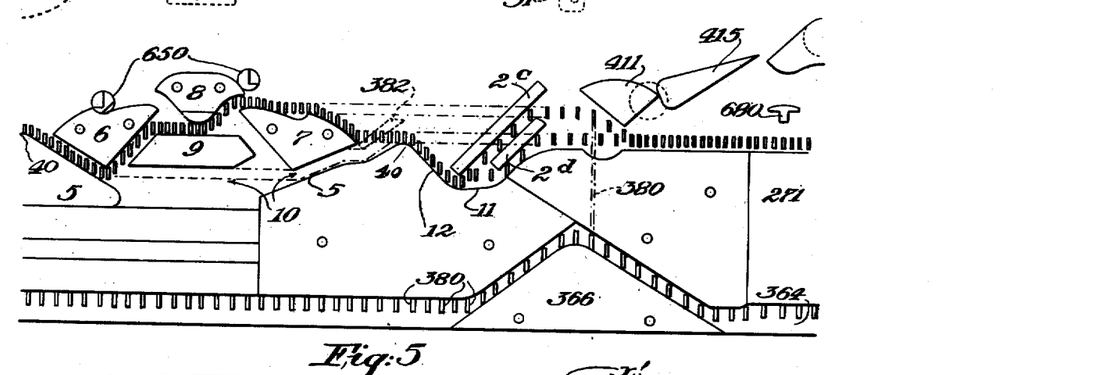
Fig. 5 is an internal development of the cam ring illustrating the main and auxiliary stitch cams.

My said machine already contains a cam slide 2, Figs. 2 and 3, and an operating lever 20 therefor, in contact with the cam 26ª on thrust bar 26 controlled by pattern drum 120. I provide upon said cam slide a supplemental stitch cam 2ᶜ, Figs. 1, 2 and 5 and a supplemental depressing cam 2ᵈ, said latter cam having some of the functions of the depressing surface of a cam carried by said slide 2 in my said application. Said cams may be removably fastened in any convenient manner, as by screws and a separating spacer 2ᵉ.

To coöperate with said cams 2ᶜ and 2ᵈ cam ring 271 is formed with a depression 11 having a slope 12 leading to an elevation 40, and preceding the location of the cam 382 and the stitch cam 7.

Needles provided with jacks 380 approaching the cams 2ᶜ, 2ᵈ, in the direction for rotary work are advanced to clear their latches by said jacks after their passage of the guide cam 411 and before their encounter with stitch cam 2ᶜ, whereupon said needles are supplied with new yarn, retracted to knit, advance at slope 12, and thence pass across the face of the cam 382, (which may be withdrawn whenever the cam 2ᶜ is in an active position) whereupon said needles pass upward to clear at leading cam 7 and knit at following cam 6 from one of the yarns supplied at yarn throat 559.

Needles without jacks approaching the cams $2^c$ $2^d$ at the tuck point of elevation 40 are depressed by cam $2^d$ at too early a time to take the yarn supplied for the supplemental stitch cam, pass into the depression 11 without having been advanced to clear their latches, and then go into the knitting cams without having previously taken the new yarn or altered the disposition of their old loop with respect to the needle latch. It will be observed that the jack cam 366, the jacks 380, cams $2^c$ and $2^d$, and a yarn guide 51 associated with cam $2^c$ constitute means for knitting with the yarn $x$ supplied at said supplemental stitch cam mechanism to recurrent needles only, and means for withholding the loops already upon the intervening needles without jacks.

Figures 14, 15, 16, 17:
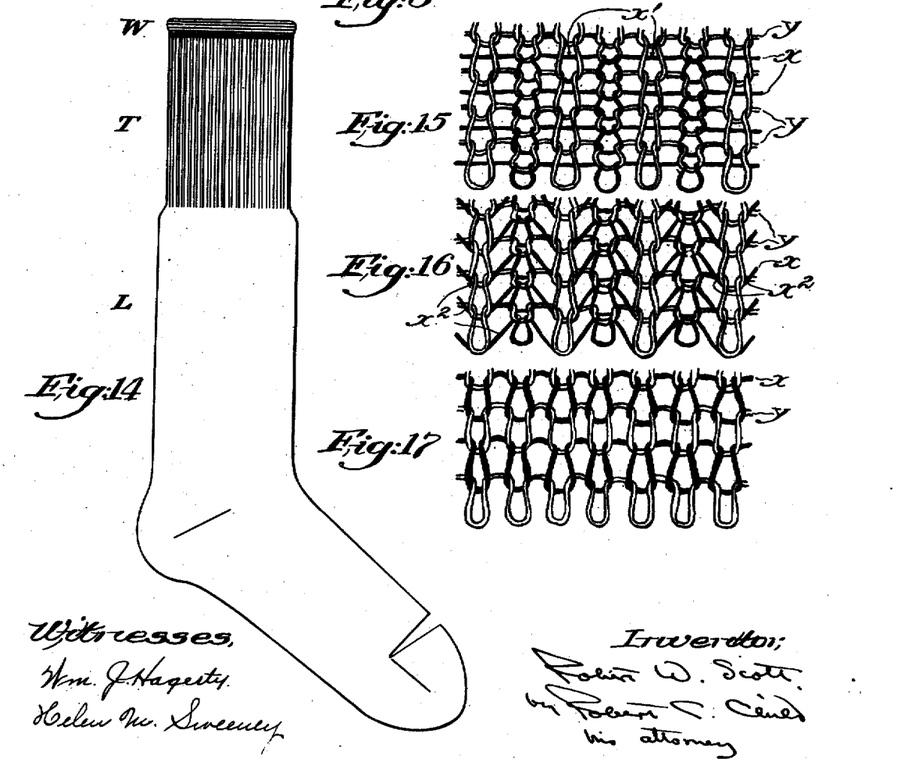
Fig. 14 is a view of one article made by the machine.
Figs. 15, 16 and 17 are views respectively of mock-rib fabric, of tucked fabric, and of plain double-course fabric.

To make the fabric illustrated in Fig. 15, in which alternate needles knit yarn $x$ and yarn $y$, the intervening needles knitting yarn $y$ only in front of a free float of yarn $x^1$ thrown to the back of the fabric, it is desirable to insure the passage of the intervening needles which have not knit at the cams $2^c$, $2^d$, in front of the yarn supplied at said supplemental stitch cams prior to the knitting of all of the needles at stitch cam 6 with a yarn $y$ from the throat 559.

It will be understood that in order to knit the article shown in Fig. 14, or other articles having sections of plain fabric knit single course, and sections of fabric T such as shown in Fig. 15, that I provide a single or multiple yarn supplied to a single knitting wave during a part of the operation, employing means for establishing and feeding a second knitting wave at some of the needles at predetermined times or during the knitting of predetermined extents of fabric, for instance to form the top T of the stocking illustrated in Fig. 14. It is important that the machine should be capable of being adjusted to knit single course or to knit double course without disturbance of the device for knitting the plain single course parts of the article, or of the function of the devices for the usual stocking knitting purposes.

For the purposes suggested it is particularly desirable to cause the web-holders 292 to coöperate with the supplemental stitch cam $2^c$, or with the intervening needles affected by the cam $2^d$ during the knitting of the double course mock-rib or accordion fabric. To avoid stretching and wear upon retained loops due to withdrawing and inserting the web-holders in the absence of the auxiliary knitting wave, and other objections to moving the web-holders during single course knitting, it is desirable to restore the web-holders to their normal operating path during the periods of inaction of auxiliary cams such as the cams $2^c$, $2^d$.

For the making of such articles, having predetermined sections of plain single course fabric and double course fabric of any kind, it is also necessary to feed a yarn in proper relation to the knitting wave formed at the supplemental stitch cams. I so control this yarn as to cause it to enter and leave the fabric at the desired and at no other times, and I prefer to arrange for severing said yarn and clamping it in a position safely out of contact with needles operating for other purposes during such times as the supplemental stitch cam is out of action. My machine is therefore provided with means for feeding, for rendering idle, severing and clamping an auxiliary yarn; with means for establishing a withdrawing wave in the web-holders in the desired relation to the needle wave formed at the needle cam $2^c$, and with means for rendering operative and inoperative the cams $2^c$, $2^d$, associated in such a manner as to cause their timely operation during the passage of a predetermined segment of the needles, a predetermined segment of the web-holders, and in relation to a predetermined operation of the yarn guides F and the remaining agencies of the machine.

A lever 50 overhanging latch ring 550 and pivoted on the same axis 554 as yarn guides F, has its extreme end bent to bring it tangential to said ring at a point above cam $2^c$. On one face of said lever an auxiliary yarn guide 51 is adjustably screwed.

Figure 6:
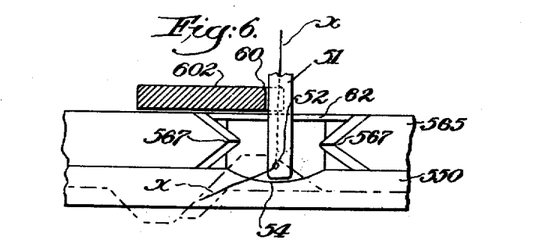
Fig. 6 is an elevation partly in section of the gap closer ring and the auxiliary yarn feed viewed from the center of the machine.
Figure 13:
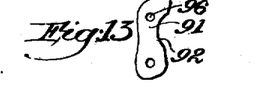
Fig. 13 is an under plan of an auxiliary advancing cam for the web-holders.

When lever 50 is depressed the supplemental yarn guide 51 extends into an annular bearing recess formed in latch ring 550 for the reception of a gap-closer ring 565 (see Fig. 6), which recess may be radially enlarged at this point in some cases, the ledge forming the bottom bearing of the said ring 565 being cut away at 54 to permit the yarn bore 52 for yarn $x$ to reach the desired height with respect to the needles advanced by their jacks 380 and jack cam 366, prior to the retraction of said needles to knit at cam $2^c$. To permit yarn guide 51 to reach the position illustrated in Fig. 6, the bracket 601 of the existing yarn cutter and clamp mechanism may be cut away at 60, and the ring 565 is cut away as shown in Figs. 3 and 6, the cut not extending to the outer periphery of said ring, but leaving a part of horizontal flange 62 to maintain the continuity of the ring 565 as far as points 566, in which the vertical element of said broken annulus 565 terminates near the yarn throat 559, as explained more at length in my said application Serial No. 845,844.

In order to prevent breakage of the latches of needles advanced to an upper position during reciprocal knitting, said gap closer ring 565 is at times rotated on its bearing on latch ring 550, to bring the gap between the points 566 opposite an unbroken part of said ring 550, and to throw one of the points 566 across the gap formed for the operation of a yarn feed guide F. A similar coöperation with the needles is effected at the location of the auxiliary yarn feed 51 by forming beveled points 567 similar to the points 566 in the vertical flange of said gap closer ring 565, so that upon rotating the ring the upper part of the cut made at 54 is bridged.

The auxiliary yarn guide lever 50 is lowered to its operative position and elevated to its inoperative position by an actuating lever 70 pivoted on an extension of the latch ring pivot 552, said lever 70 having an enlargement 71 taking over the bent upper end of thrust bar 26, said lever also being provided with a shoulder 72 taking under a flat on said lever 50. Lever 70 terminates in a boss 74 bored to receive a spring plunger 75.

Mounted on cap ring 300, as by pivoting on an elongated abutment screw 303 in one of the lugs 304 a lever 85 extends above the part of the periphery of the cam cap 300 toward the observer in Fig. 1. Lever 85 terminates at 86 in a flat upon which plunger 75 rests, is normally maintained in an elevated position by a spring plunger carried in nipple 87, and is held on its pivot 303 by collar 84.

Lever 70 is rotated on stud 552 to elevate auxiliary yarn guide lever 50 and to permit lever 85 to be elevated by its spring plunger, for instance by a relatively strong spring 73 attached to said lever 70 at one end and to a limit screw 22 carried by bracket 21 at its other end, whenever cams 517 on drum 120 permit thrust bar 26 to be lowered.

Referring now to Figs. 4, 7 and 8, an auxiliary withdrawing cam 88 for the web-holders 292 is carried by the lever 85 for substantially vertical movement about the pivot 303 as a center. Said cam may comprise a plate adjustably fastened by screws 89 on the upper surface of lever 85, said plate having a downward extension cam shaped at its working end substantially as shown in Fig. 4, and capable when lever 85 is depressed of entering a cut 90 formed through web-holder cam cap 300 to stand across concentric groove 305 at the proper point in relation to the needles elevated by the jacks 380.

For durability of construction and accuracy of operation I prefer to build up the cam cap 300, as illustrated in Figs. 7 and 8, of a separate incomplete shouldered annulus 301, which may be of hardened steel, sprung in place to form the inner margin of groove 305, the main body of said ring 300 comprising a casting having lugs 304 and enlargements 317, and a turned flat on its under side to form the floor of the groove 305, a turned depending outer flange 318 providing a running bearing upon the shouldered web-holder bed 295.

The main web-holder withdrawing cam 306 is provided with beveled ends, and may be fastened to cap 300 by screws 319, thus filling the gap formed in ring 301, which is cut away on a chord of the circle defined by it, in such a manner as to leave no sharp edges at the meeting-points of cam and ring to cause breakage of web-holder butts. Ring 301 determines the inmost position of the web-holders, and the described construction, enabling it to be hardened as a protection against the rebound of the web-holder butts, and enabling easy removal and assembly, is of importance to the operation of the machine.

A flattened portion of ring 301, as at 320, may be provided to permit cam 88 to stand across the circular path of the web-holder butts. The opening 90 for the movement of cam 88 may be formed as an open depression in the inner face of cap 300, as shown, ring 301 when in place closing the inner part of said opening. Outward movement of web-holder butts by the cam 88 is permitted by enlargement 92 of the outer periphery of groove 305, which enlargement may be defined by an adjustable cam 91 housed in a horizontal slot 93, Fig. 1, formed through the enlargement 317 of cap 300, in which slot said cam 91 is frictionally held in its adjusted position by countersunk pinch screws 94 taking into enlarged bores 96 in said cam 91, one end of which is an adjustable advancing cam for movement of the web-holders 292 inward to their normal concentric path 305. This path is such as to cause the web-holders to project between the needles, to maintain the yarn under a sufficient tension against the shanks of the needles.

The relative position of the wave formed by the web-holder cam 88 and the wave formed by the coöperation of jacks 380 and cam $2^c$ is such as to maintain said web-holders forward to hold down the web during the advance of the needles by the jacks 380, and reinsert said web-holders prior to, at or near the most depressed position of the needles due to the cams $2^c$ and $2^d$, thereby again advancing the web-holders prior to the rise of the needles up the slope 12, thus to secure the passage behind the advancing needles which have not taken yarn $x$ at supplemental yarn feed 52 of the floats or sinker wales $x^1$, Fig. 15, of said yarn $x$.

For automatic operation, it is desirable to move the cam slide 2, when the auxiliary wave is to be formed in the needles, in two or more stages, the first taking place during the passage of the short butt needles and the second taking place after the leading long butt needles have passed down the face of the cams $2^c$, $2^d$.

My machine may therefore be provided as shown and claimed in my said application 766,401 with means for securing the movement of said cam slide 2 at such times, the said means resulting in the elevation of thrust bar 26 in two or more stages for instance by the operation of a cam such as cam 517 on a pattern surface, such as said drum 120, moved intermittently at the time of passage of the required part of the series of needles.

As more fully described in my said applications, it is desirable to operate some of the web-holders at cam 312, for instance those associated with the short butt needles, so as to draw longer stitches locally, and for this purpose said web-holders are provided with long butts as illustrated at 29 in Fig. 9, the remaining web-holders being provided with short butts as at 28, Fig. 11.

The first movement of bar 26, lever 70, and lever 85 will therefore occur during passage at the auxiliary stitch cams of needles having short butts and of web-holders having long butts, but it is desirable at this time to establish the auxiliary wave in the web-holders, and for this purpose the cam 88 must enter upon the series of web-holders traveling in the concentric groove 305. This can not be done with respect to the unbroken series of long butt web-holders 29, and I therefore provide among said long butt web-holders certain web-holders having intermediate butts 27, Fig. 10, upon which the said cam 88 may enter to first operatively encounter and move outward a web-holder having a long butt 29 following the series 27.

An alternative structure for this purpose is illustrated in Fig. 12, showing a cam 88$^a$ having a beveled operative face and a web-holder having a butt 29$^a$ beveled on the side toward the center of the needle carrier, so that movement of the cam transversely to the path of the web-holder butts will force enough of them outwardly to permit the cam to enter its final operative position.

It will now be understood without further description that the operation of thrust bar 26 secures entrance of the auxiliary yarn guide, entrance of the auxiliary stitch cam, of the auxiliary supplemental cam 2$^d$, and entrance of the auxiliary web-holder cam 88. The devices described accomplish the movement of said web-holders, beginning at a predetermined point, through their full retraction and advance without moving any of them to an intermediate position only. I believe it to be new to enter and retract a web-holder cam in a direction transverse to the plane of operation of the web-holders.

To make the product illustrated in Fig. 14, the machine may be operated either after prior knitting or as is more fully disclosed in my said application, 766,401 with the aid of movement of cam 382 and the separation of the needles into intercalated series by the jacks 380 to knit a selvage from one of the yarns $y$, the operation including the removal of cam 382 to permit at least one course to be knit upon all of the needles; said cam 382 is then operated to cause the needles without jacks to withhold their loops at each passage of the stitch cams during the knitting of the welt $w$ of a predetermined extent, at the main knitting cams, whereupon the cam 382 is withdrawn to permit all of the needles to knit a uniting course for the welt and following fabric. Simultaneously with the withdrawal of said cam or after the making of one or more courses at all of the needles, thrust bar 26, lever 70, cam slide 2, the auxiliary yarn guide and the auxiliary web-holder cam are put into operation to establish knitting on the needles having jacks with respect to the auxiliary yarn $x$, the needles without jacks passing in front of the sinker wales $x^1$ of the other needles, all of the needles knitting a course at the main cams from one of the main yarns $y$.

The yarns $x$ and $y$ may be of the same kind as each other or as the body of the fabric or as employed for the welt W, but I prefer to operate the yarn guides F simultaneously with the entrance of auxiliary yarn $x$ to exchange the yarn $y$ used for the welt for another yarn $y$ suitable to the accordion or mock-rib fabric produced, for instance a heavier yarn, or one of a color different from yarn $x$.

Upon the completion of the desired extent of the accordion or mock-rib fabric as determined by the form of cam 517 and the movements given to the drum 120, the auxiliary yarn $x$ is withdrawn from its operative position; the auxiliary stitch cam 2$^c$ is withdrawn, and the auxiliary web-holder cam is withdrawn. This movement may occur in two stages corresponding to motions of thrust bar 26, the first during the passage of the long butt needles and the second after their passage; but the resulting movement of the auxiliary yarn guide 51 may not become effective to withdraw the yarn $x$, owing to the motion of the yarn guide being substantially in the plane of the needles, until the second stage of the movement. It is not detrimental that a few of the needles having jacks 380 should take the yarn $x$ after the partial withdrawal to run off the end of the high butt series, of the cam 2$^c$. When this occurs the yarn $x$ is taken in the hooks of the needles with jacks, the same needles also receiving yarn $y$ at the main knitting cams, where both yarns are drawn through the loops of a previous course.

The auxiliary yarn carrier having risen to the position shown in Fig. 1, its yarn extends from the bore 52 to that point in the fabric at which it definitely passed above and within the needles, rotating counter-clockwise as viewed in Fig. 3. The auxiliary yarn $x$ is therefore drawn into the position illustrated lying close against the under side of the bracket 601, whence it passes above the fabric guide plate 602 under the guide 604 and clamp 606, and into the cutter 608 forming a part of the existing machine. Cutter 608 being separately worked from drum 120, is arranged to cut the yarn $x$ when it has reached said position. Yarn $x$ is preferably fed under slight tension.

The idle position of yarn $x$ is such as to insure maintaining it out of contact with needles performing any of the operations for the remainder of the stocking.

The exit of the auxiliary web-holder cam 88 occurs during the passage of the short butt needles and preferably at that section of the web-holders provided with the medium butts 28 placed among web-holders having the long butts 29 associated with the short butt segment of the needles. But the cam 88 may be withdrawn in any position without displacing the web-holders, the inthrow cam 91 moving all the web-holders in to their normal concentric position. It will be observed that the actuating lever 70 does not positively move either lever 50 to introduce the yarn or lever 85 to enter the webholder cam, movement of said actuated parts being due to spring 53 and spring plunger 74, whereby accidents of timing will not cause breakage of parts.

The form of my device above described is adapted, upon the operation explained of lever 70 and of cams $2^c$ and $2^d$ to form in the plain fabric stocking produced by the remaining devices a section of fabric such as shown in Fig. 15, beginning and ending at points predetermined by the position and extent of cam 517, Fig. 1, on drum 120.

With an addition about to be described, the machine may readily produce instead the other varieties of multiple course fabric shown in Fig. 16 or in Fig. 17, beginning and ending such sections at predetermined points in the otherwise plain fabric stocking produced.

Figure 18:
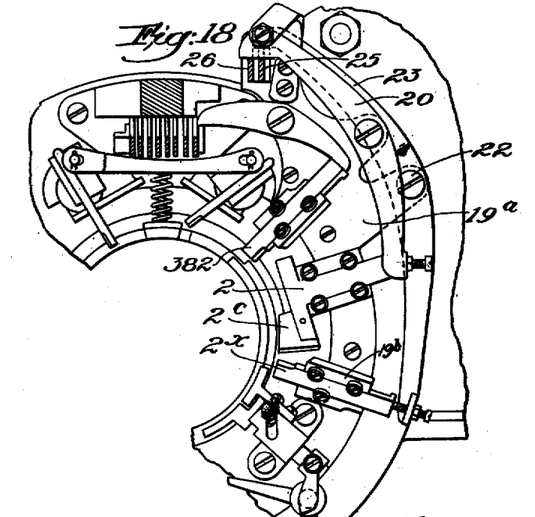
Fig. 18 is a partial plan similar to Fig. 2 illustrating additional mechanism.
Figure 19:
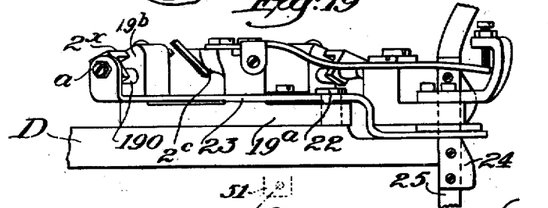
Fig. 19 is a detail side elevation of some of the devices of Fig. 18.
Figure 20:
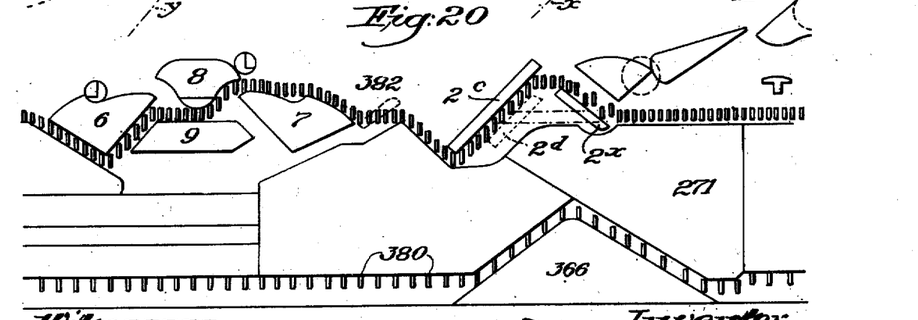
Fig. 20 is a cam development illustrating the means for tucking and for plain double-course knitting.

Referring to Figs. 18, 19 and 20, a supplemental advancing cam $2^x$, made like cam 382, as an inclined radial slide, and working in a slotted standard $19^b$ of the bracket $19^a$ carrying the mountings for cam 382 and cam slide 2, stands normally withdrawn from contact with needles. When moved inward said cam $2^x$ advances all of the needles to clear their latches at a point preceding the supplemental stitch cam $2^c$.

When inserted to contact with the needle butts, and when yarn guide 51 is in its operative position, all of the needles take yarn and knit at the auxiliary wave at cam $2^c$, as well as at the main cams 6 and 7. The fabric produced is then double-course plain fabric alternately of yarns $x$ and $y$, as shown in Fig. 17.

If the cams $2^c$ and $2^d$ remain in position during the absence of cam $2^x$, and when the slide 2 is in operative position, the accordion fabric of Fig. 15 will be produced.

For tucking (see Fig. 16), cam $2^d$ is removed from slide 2, as shown in Figs. 19 and 20. The normal position of cam $2^d$ when in place is shown in dotted lines in Fig. 20.

When cam $2^x$ is withdrawn, needles without jacks 380 moving at the tuck position at which they are left by the main cams pass across the face of cam $2^x$ in a position not high enough to have cleared their previous loops, but high enough to take yarn $x$ at their passage down the face of supplemental cam $2^c$.

The needles provided with jacks 380 will be cleared by the jacks before they take yarn $x$, and the needles with jacks will therefore knit with yarn $x$, at cam $2^c$ but the needles without jacks will accumulate a loop $x^2$, Fig. 16, of yarn $x$ in addition to their retained loop of yarn $y$ during their passage of said cam $2^c$. All the needles will knit at the main cams with yarn $y$. The fabric of Fig. 16 will thus be produced. Insertion of cam $2^x$ will now cause all the needles to knit at cam $2^c$, to make the fabric of Fig. 17.

By replacing cam $2^d$, it will be seen that by inserting cam slide 2, the fabric of Fig. 15 will be formed by the devices of Figs. 18 to 20; in that case, by then inserting cam $2^x$, the plain double-course fabric of Fig. 17 may be formed in the same article at predetermined points; and by withdrawing cams $2^c$, $2^d$ and $2^x$, and removing yarn $x$, plain single feed fabric may be formed in continuation of either of the previous fabrics.

When the arrangement is that illustrated in Figs. 19 and 20, cam $2^d$ being removed, automatic change in any desired order will be made from the tucked multiple-course fabric of Fig. 16 to the double-course plain fabric of Fig. 17, and thence to single course plain fabric upon first inserting cam $2^c$ and yarn $x$, then inserting cam $2^x$, and then withdrawing yarn $x$ and the auxiliary knitting cams $2^c$ and $2^x$. Or, cam $2^d$ being replaced, any order of (1) single course plain fabric (2) multiple course accordion, (3) multiple course plain fabric can be made automatically by the proper consecutive movement of the cams.

Cam $2^x$ is preferably operated as shown by a spring plunger 190 normally holding it withdrawn, a bent lever 23 pivoted at 22 on an extesion of bracket $19^a$ carrying adjustment screw $a$ in contact with said cam at one end, its other end resting against a cam 24 carried by a thrust bar 25 parallel with, near to, and similar to thrust-bar 26. Suitable cams on drum 120 (not shown) similar to cam 517 cause the timely movement of cam 2× inward and outward in two stages in advance of its withdrawn position. These cams are exchangeable, and their position on drum 120 will be determined by the place extent and order in the article to be produced of the variations in the fabric capable of being made.

I am aware that the fabric illustrated in Fig. 15 is of ancient common knowledge and use in stockings, for instance as illustrated and described in the Letters Patent to Clark Older No. 552,583 dated January 7, 1896, and that the fabrics of Figs. 16 and 17 are old fabrics, and I do not herein claim broadly every means for knitting such fabric, or for knitting stockings having sections of such fabric.

What I claim is:

1. A knitting machine having in combination means for knitting plain fabric having an integral welt and means for forming said plain fabric by multiple-course knitting.

2. A knitting machine having in combination means for knitting single-course turned welts integral with plain fabric and means for knitting parts of said plain fabric by single-course and parts by multiple-course knitting.

3. A knitting machine having in combination automatic means for knitting and uniting together the beginning and end of a predetermined extent of plain single-course welt fabric and one end of a predetermined extent of multiple-course mock-rib fabric.

4. A knitting machine having in combination needles and means for knitting a predetermined extent of plain fabric on recurrent needles only from a single yarn in successive courses, and means for knitting continuously therewith fabric having parts knit on all of said needles from a plurality of yarns in interleaved courses.

5. A knitting machine having in combination means for knitting fabric for an integral turned welt, means for forming a section of plain fabric by multiple-course knitting, and devices for causing said means to be operative at predetermined times, to predetermined extents, during the manufacture of an article of hosiery.

6. A knitting machine having in combination means for knitting and uniting together a predetermined extent of tubular single-course welt fabric and a predetermined extent of tubular multiple-course mock-rib fabric, and means for thereafter knitting the remainder of a stocking having a seamless leg, foot, heel and toe portions.

7. A knitting machine having in combination means for knitting and uniting together a predetermined extent of tubular single-course welt fabric and a predetermined extent of tubular multiple-course mock-rib fabric, and means for thereafter knitting the remainder of a stocking having a single-course seamless leg, foot, heel and toe portions.

8. A knitting machine having means for knitting plain fabric seamless sections of a stocking, including heels and toes, in combination with means for knitting continuously therewith an integral out-turned welt and means for knitting a multiple course mock-rib top section.

9. A knitting machine having in combination needles, reciprocal stitch cams, and an auxiliary cam, said cams together being adapted for knitting a plurality of courses simultaneously, and means adjustable to cause some of the needles in one direction of knitting to pass at times one and at times another of said knitting cams while withholding their previous loops.

10. A knitting machine having needles, reciprocal main cams and an auxiliary knitting cam for knitting a plurality of courses simultaneously, and means to cause recurrent needles to pass said main cams while withholding their loops, in combination with means for rendering one of said cams inactive upon any of said needles.

11. A knitting machine having in combination needles, reciprocal stitch cams and an auxiliary cam, said cams together being adapted for knitting a plurality of courses simultaneously, and means to cause some of the needles during predetermined times to pass one and thereafter to pass another of said knitting cams while withholding their previous loops.

12. A knitting machine having needles in the usual longer and shorter butt series, cams adapted to act on all the needle butts for knitting a plurality of courses simultaneously, and means to cause recurrent needles to pass one of said cams while withholding their loops, in combination with means for rendering another of said cams active and inactive at predetermined times.

13. A knitting machine having in combination needles and cams each acting on the same needles for knitting a plurality of courses simultaneously, means to cause some of the needles to pass one of said knitting cams while withholding their previous loops, and means movable to cause all of the needles to knit or to cause some of the needles to withhold their loops at another knitting cam.

14. A knitting machine having in combination needles having operating butts and cams each acting on said butts for knitting a plurality of courses simultaneously, means to cause recurrent needles to pass one of said knitting cams while withholding their previous loops, and means movable to cause said needles to knit or to withhold their loops during knitting at intervening needles at another knitting cam.

15. A knitting machine having needles, main and auxiliary cams acting on the same needles respectively for knitting a plurality of courses simultaneously, and means to cause recurrent needles to pass said main cams while withholding their loops, in combination with means for causing all of said needles to knit at said main cams and means for rendering an auxiliary cam active and inactive upon recurrent needles only during knitting on all of the needles at said main cams.

16. A circular knitting machine having a needle cylinder, needles, main knitting cams and means for knitting fabric of a predetermined extent upon said needles, and means coöperating with said main cams for knitting out-turned welts, in combination with an auxiliary knitting cam, auxiliary yarn feed and auxiliary web-holder mechanism therefor, and means for causing operation of said auxiliary devices during the production of predetermined parts of said fabric.

17. A knitting machine having needles, a stitch cam, web-holders and actuating means therefor, in combination with an auxiliary stitch cam, an auxiliary withdrawing cam for said web-holders and an auxiliary yarn feeding guide, and means for simultaneously moving said auxiliary devices into and out of operative relation with the said needles and web-holders.

18. A knitting machine having needles, main knitting cams, main yarn feeding devices, web-holders and operating means therefor, in combination with an auxiliary stitch cam, an auxiliary withdrawing cam for said web-holders, an auxiliary yarn feeding guide and means for moving all of said auxiliary devices into and out of operative relation to said needles at predetermined times during the production of an article by knitting at said main cams.

19. A knitting machine having needles, main knitting cams, main yarn feeding devices, web-holders and operating means therefor in combination with an auxiliary stitch cam, an auxiliary withdrawing cam for said web-holders, and an auxiliary yarn feeding guide and means for simultaneously moving said auxiliary devices into and out of operative relation to said needles and web-holders during passage of predetermined segments thereof.

20. A knitting machine having needles, main knitting cams, main yarn feeding devices, web-holders and operating means therefor, an auxiliary stitch cam, an auxiliary withdrawing cam for said web-holders and an auxiliary yarn feeding guide, in combination with means for moving said auxiliary devices into and out of operative position in two or more stages corresponding to the passage of predetermined segments of said needles.

21. A knitting machine having in combination independently movable needles, main knitting cams and means to deflect some of the needles into an idle path thereat, an auxiliary stitch cam, means to supply yarn at said main cam and at said auxiliary cam, means to advance some of said needles intercalated among the others to clear their latches prior to their encounter with said auxiliary stitch cam and means to deflect other needles beneath said auxiliary stitch cam and out of contact with said auxiliary yarn.

22. A knitting machine having needles and web-holders, a main knitting cam, a main web-holder cam and means for knitting thereat, an auxiliary knitting cam, an auxiliary withdrawing cam for said web-holders, and means for entering and removing said auxiliary web-holder cam in a direction transverse to the operative movement of said web-holders.

23. A knitting machine having means for knitting a plurality of yarns at separated points comprising needles, web-holders, main needle and web-holder actuating cams in combination with an auxiliary needle cam movable into and out of operative contact with said needles and an auxiliary web-holder cam mounted for movement into and out of operative contact with said web-holders.

24. A knitting machine having means for knitting a plurality of yarns at separated points comprising needles, web-holders, main needle and web-holder actuating cams in combination with an auxiliary needle cam movable into and out of operative contact with said needles, an auxiliary web-holder cam mounted for movement into and out of operative contact with said web-holders, and means for moving said respective auxiliary cams into and out of operative position at predetermined times.

25. A knitting machine comprising needles, web-holders and means for feeding a plurality of yarns at separated points at main and auxiliary knitting waves, having in combination an auxiliary knitting cam, an auxiliary web-holder cam, and means for moving said cams out of and into contact with the needles and web-holders respectively to determine single-course and multiple-course knitting.

26. A knitting machine comprising needles and web-holders in separate segments having operating butts of different lengths and means for feeding a plurality of yarns at separated points at main and auxiliary knitting waves, having in combination an auxiliary knitting cam, an auxliary web-holder cam, and means for moving said cams into and out of contact with the needles and web-holders respectively during passage of segments of said instruments having shorter butts.

27. A knitting machine for knitting fabrics having single-course and multiple-course parts having therein in combination an auxiliary knitting cam, web-holders, a web-holder cam and a yarn-guide device coöperating therewith, and pattern-controlled actuating means for simultaneously moving said yarn-guide device and knitting cam into operative and inoperative positions, and for bodily moving said web-holder cam into and away from operative contact with said web-holders.

28. A knitting machine for knitting fabrics having single-course and multiple-course parts having therein in combination an auxiliary knitting cam, a web-holder cam and a yarn guide device coöperating therewith, and pattern-controlled actuating means for simultaneously rendering said devices operative and inoperative comprising a mounting for each of said devices permitting movement into and out of position for operation, and a common connection for moving said devices.

29. A knitting machine for knitting fabrics having single-course and multiple-course parts having therein in combination an auxiliary knitting cam, a movable auxiliary web-holder cam, and a movable yarn guide for an auxiliary yarn; an actuator lever, mountings for said web-holder cam and yarn-guide pivoted to swing in the plane of movement of said actuator lever, and pattern controlled means for operating said lever to simultaneously enter and remove from operative position said web-holder cam and yarn guide.

30. A knitting machine for knitting fabrics having single-course and multiple-course parts having therein in combination a movable auxiliary knitting cam, a movable auxiliary web-holder cam, and movable yarn-guide for an auxiliary yarn; an actuator lever, mountings for said web-holder cam and yarn-guide pivoted to swing in the plane of movement of said actuator lever, and pattern-controlled means for operating said knitting cam and said lever to simultaneously enter and remove from operative position said knitting and web-holder cams and said yarn guide.

In testimony whereof, I have signed my name to this specification in the presence of two subscribing witnesses:

ROBERT W. SCOTT.

Witnesses:
RUTH A. ROPER,
MARGARET F. GOOD.